METHOD AND APPARATUS FOR THE MAGNETIC SEPARATION OF FINE PARTS

Filed Sept. 1, 1967

INVENTORS
B.G. CASNER
R.T. GOULSTONE
BY J. L. Landis
ATTORNEY

United States Patent Office 3,474,904
Patented Oct. 28, 1969

3,474,904

METHODS AND APPARATUS FOR THE MAGNETIC SEPARATION OF FINE PARTS

Bernard G. Casner, Emmaus, and Ray T. Goulstone, Allentown, Pa., assignors to Western Electric Company, Incorporated, New York, N.Y., a corporation of New York Filed Sept. 1, 1967, Ser. No. 665,169
Int. Cl. B07c 5/344
U.S. Cl. 209—111.8 6 Claims

ABSTRACT OF THE DISCLOSURE

Improved methods and apparatus are provided for the magnetic separation of a plurality of small parts. The parts are allowed to settle in a column of low viscosity liquid while one region of the column is subjected to the influence of magnetic lines of flux. Parts with magnetic properties are deflected toward the magnet in their downward descent and are caused to be deposited in an isolated chamber of the column.

BACKGROUND OF THE INVENTION

Field of the invention

This invention generally relates to the magnetic separation of a plurality of small parts. The invention is especially concerned with magnetically sorting a plurality of small parts that have been formed from a single sheet of nonmagnetic material, which sheet, prior to its subdivision, has been inspected and defective regions have been given a magnetic identification. Accordingly, this invention provides improved methods and apparatus that will facilitate the magnetic separation of small, magnetically identified parts formed from defective regions of a sheet of material from the remaining small parts not so magnetically identified.

While this invention may find utility in many magnetic separation operations, it is described herein for convenience and clarity with specific regard to the manufacture of semiconductor wafers, which is particularly illustrative of the practice of the invention. It is to be understood, however, that the invention is not intended to be limited to the manufacture of semiconductor wafers.

Description of the prior art

It is conventional in the manufacture of semiconductive devices to subdivide a crystal of semiconductive material into a series of thin discs by making a number of parallel slices through the crystal. These discs, referred to herein as "slices," are given appropriate treatment, as by doping with desired conductivity-type determining impurities, and each slice is then divided into many hundreds of small chips or wafers. The slices are usually comprised of a rather hard, brittle material, such as silicon or germanium, thus the shaping of the wafers is readily accomplished by one of several known methods, such as by sawing the slice with a diamond-impregnated wheel, or by mounting the slice on a ruling engine, scribing fine lines with a diamond stylus, and then breaking the slice along the scribed lines. In addition, ultrasonic cutting or grit-blasting techniques are used in some applications.

Prior to the final assembly of the wafers, it is necessary to inspect the wafers visually and electrically in order to identify and discard wafers that fail to meet physical and electrical specifications. Because semiconductor wafers are quite small (a typical wafer may be only 4 to 6 mils in thickness and 20 mils square), manipulation of the individual wafers during inspection and testing operations is a tedious process. For this reason, it has been found economically desirable to inspect selected areas of a slice from which semiconductor wafers will be formed, prior to the time that the slice is divided into individual wafers.

Typically, a pattern of grid lines is etched through the oxide layer on the surface of a slice to outline the specific areas of the slice from which each individual wafer will be formed. Sensing elements of a test probe are then sequentially indexed from one area to the next, and certain of the electrical properties are measured. At the same time, or during a separate operation, an operator may inspect each outlined area under a microscope for any visible flaws that may appear on the surface of the slice.

When defective areas on the surface of the slice are detected, these areas are identified with a mark or symbol so that, after the slice has been divided into individual wafers, the wafers formed from these defective areas can be separated from the remaining wafers that have passed inspection.

One method of identifying the defective wafers utilizes a marking instrument, such as a pen, that, upon signal from the operator or the electrical testing device, will cause a small drop of ink to be deposited on the defective area. The ink mark provides a visual identification that enables an operator to sort out the defective wafers.

It will be appreciated that considerable dexterity is required in manual sorting of the wafers since it is possible to produce several thousand wafers from a single slice only an inch or two in diameter. In examining the wafers, the operator must view the wafers under magnification and use a vacuum pencil or similar device to pick up and manipulate each wafer. Further, since an ink dot is deposited on only one side of a defective wafer, the wafers must be turned over and examined on both sides to insure a thorough inspection.

It is understandable that the accuracy of this tedious and time-consuming sorting process is subject to human error and that some defective wafers may pass undetected. Therefore, in order to increase both the speed and efficiency of the sorting operation, it has been suggested that defective areas of a slice be identified by depositing a small dot of magnetic particles on the surface of the slice. Then, after the slice has been divided into wafers, those wafers formed from defective areas can be separated from the others by magnetic means.

In a related, commonly assigned, copending application, Ser. No. 664,703, filed Aug. 31, 1967, we together with co-applicant P. R. Hance, have described a system especially adapted for marking defective areas of a slice with a magnetic fluid. Briefly, this system includes an improved magnetic marking fluid of controlled viscosity that is comprised of a suspension of magnetic particles in a substantially nonvolatile carrier liquid, especially adapted to be fed by means of an improved marking device. Upon signal, a metered amount of the magnetic fluid is expressed from the marking device and is deposited with precision over selected areas on the surface of the slice.

In a preferred embodiment of that invention, the operation of the marking device and the delivery of the magnetic fluid are controlled by signals received from electrical testing apparatus so that a dot of magnetic fluid will automatically be deposited at any point on the surface of the material that is found to be defective by the electrical testing apparatus.

In distinction to this related patent application, the instant invention relates to methods and apparatus for magnetically separating the wafers after the slice has been inspected, its defective areas have been magnetically identified, and the slice has been divided into a plurality of wafers.

SUMMARY OF THE INVENTION

Accordingly, it is an object of this invention to provide improved methods and apparatus for separating a plurality of small parts in accordance with their magnetic properties.

Another object of this invention is to provide an improved magnetic separation device that is especially designed to facilitate the magnetic separation of a plurality of small parts.

A more specific object of this invention is to provide an improved method and device that will magnetically separate any defective parts that have been identified with a small dot of magnetic material from the remaining parts that are free from defects and have not been so magnetically identified.

Briefly, these and other objects of this invention are achieved by causing the small parts to settle in a column of liquid while one region of the column is subjected to the influence of magnetic lines of flux. Since the liquid is selected to have a low viscosity, the parts magnetically identified are readily deflected in their downward descent toward the magnet and can be collected in an isolated chamber of the column, thereby effectively separating the magnetic parts from the others.

Figure 1:
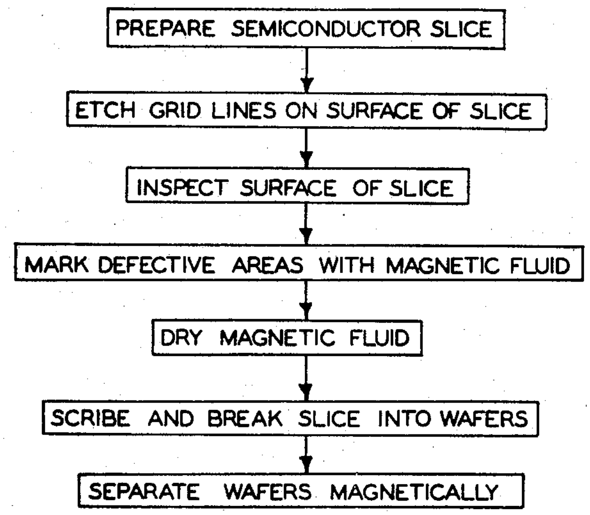
FIGURE 1 is a schematic flow sheet illustrating the general background of this invention.

Referring first to FIGURE 1, a semiconductor slice is initially prepared by cutting it from a large crystal usually grown from a Group IV element such as silicon or germanium. After the slice is carefully cleaned and polished, it is doped with materials such as elements from Groups III and IV of the Periodic Table to establish the desired number and types of p-n junctions. The slice is now suitably prepared for subdivision into a number of wafers from which semiconductors, such as diodes and transistors, can be manufactured.

While the slice is being doped, a hard oxide layer may be formed on its surface. Because the oxide layer is resistant to normal scribing apparatus, such as a diamond stylus, it has been found convenient to etch a grid line pattern, as with hydrofluoric acid, on the surface of the slice. Thus, not only is the hard oxide layer removed for cutting purposes, but also the individual areas of the surface of the slice from which each wafer is to be formed are clearly identified for inspection.

After the grid lines have been etched, the slice is mounted on testing apparatus so that it may be contacted with test probes. The slice is indexed under the probes and, at each indexed position, a separate grid area (representing a future wafer) is contacted with the test probes for measurement of certain electrical properties. At this or a later time, each distinct area is also inspected for visible flaws under a microscope. Any area failing to pass inspection is identified by marking it with a fluid suspension of magnetic particles (hereinafter referred to for convenience as a "magnetic fluid").

After the inspection of the surface the slice is complete, the slice is set aside, preferably in an oven, to allow the magnetic fluid to dry to a relatively hard, nonsmearing solid. When the magnetic fluid is dry, the slice is mounted on a ruling engine and fine lines are scribed within the etched grid lines by using a fine diamond-tipped stylus. The slice is then broken into individual wafers by any convenient technique such as by placing the slice between two thin sheets of flexible material and then running a small roller back and forth over the surface of the enclosed slice.

After the individual wafers have been formed, they are sieved to remove random small chips and pieces as well as any oversize material. The middlings are then subjected to the influence of a magnetic field and the inferior wafers containing a deposit of magnetic particles are separated from those wafers that have passed inspection.

Figure 2:
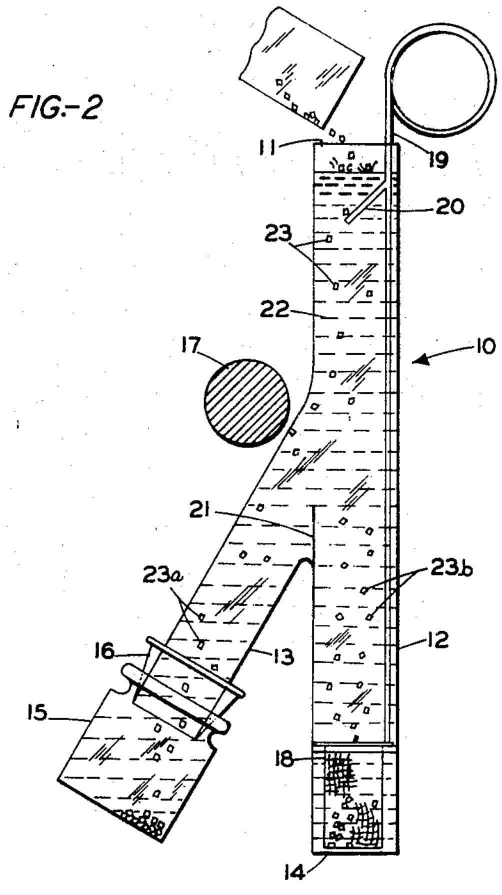
FIGURE 2 is a side view, partially in section, of a preferred embodiment of the apparatus of this invention.

A preferred apparatus for the practice of this invention is illustrated in FIGURE 2. This magnetic separation apparatus is comprised of a Y tube 10 having an open upper end 11, a vertical leg 12, and a slanted side leg 13. The vertical leg 12 terminates at a bottom closure 14 and the slanted leg 13 is open at its lower free end. A glass container 15 having a ground glass lip is adapted to be attached in sealing relationship with the open free end of the slanted leg 13. A magnet 17 is located immediately adjacent to the slanted side leg 13 at a point near the upper intersection of the slanted side leg 13 with the vertical leg 12.

Included within the vertical leg 12 is a wire screen basket having openings sized to permit the free passage of liquid but to restrain the passage of any wafers. The screen basket 18 is adapted to be removed and inserted into the vertical leg 12 by means of a handle 19 that extends the length of the vertical leg 12. A baffle or deflection plate 20 is mounted upon the handle 19 adjacent the upper end of the Y tube 10. The deflector plate 20 is slanted downwardly toward the side leg 13 so that material sinking over the baffle will be deflected toward the magnet 17. Also, a vertically disposed baffle 21 may be located adjacent the lower intersection of the slanted side leg 13 and the vertical leg 12. This baffle 21 serves to decrease the free area of the intersection of the slanted side leg 13 and the vertical leg 12.

The Y tube 10 is filled with a liquid 22. The nature of the liquid is not particularly critical although certain requirements must be met. First, it is desirable to select a liquid that will not contaminate or otherwise injure the wafers 23—23. Second, for ease of operation, the liquid should wet the surface of the wafers 23—23 so that they will not float on the meniscus of the liquid 22. Third, while the density of the liquid is not particularly critical, it must, of course, be less than that of the wafers 23—23. Lastly, the liquid should have a comparatively low viscosity so that there will be no appreciable shear forces to prevent the free movement of the parts sideways across the Y tube 10. By way of example, trichloroethylene makes an ideal liquid for use in the magnetic separation of semiconductor wafers since it has a low viscosity, it will wet the surfaces of the wafers, and as an additional advantage, it will degrease and clean the wafers while they are undergoing treatment.

In operation, a plurality of wafers 23—23 are deposited in the upper open end 11 of the Y tube 10 nd allowed to settle therein. Previously, these wafers have been inspected while in the form of a slice, the defective areas have been identified with a dot of magnetic particles, and the slice has been subdivided into individual wafers 23—23. In their downward descent, the particles 23—23 are first deflected by means of baffle 20 toward the side of the vertical leg 12 that is closest to the magnet 17. The particles 23—23 continue to settle in close proximity to the magnet 17 and those particles **23*a*—23*a* that bear magnetic identification are brought under the influence of magnet 17 and further deflected sideways in their downward descent into the slanted side leg 13. Since the liquid 22 has a low viscosity, no appreciable shear forces are developed and the magnetically identified particles 23*a*—23*a* are readily deflected by the magnet 17**.

The remaining wafers **23*b*—23*b* that bear no magnetic identification continue in a substantially vertical descent past the baffle 21 and fall into the wire basket 18 at the bottom of the vertical leg 12 where they are collected. When desired, the wire basket 18 is removed from the vertical leg 12 by means of the handle 19. The basket 18 may then be emptied and the good wafers 23*b*—23*b*** sent to further processing.

Periodically, when a sufficient number of bad wafers **23*a*—23*a* are accumulated in container 15, the fluid 22 is removed from the Y tube 10 and the glass container 15 is detached from the free end of the slanted side leg 13. The defective wafers 23*a*—23*a* are then removed from the glass container. When it is desired to reuse the device, it is necessary only to replace the glass container 15 and fill the Y tube 10 with liquid 22**.

From the foregoing description of the drawings, it may be appreciated that a simple, effective and efficient method and apparatus for magnetically separating finely divided parts or particles is provided. Although the parts and the amount of the magnetic deposit on them may be extremely small, the free settling of the parts in a low viscosity fluid makes it possible to deflect them magnetically and sort them from the nonmagnetic parts with considerable accuracy.

Although certain embodiments of the invention have been shown in the drawings and described in the specification, it is to be understood that the invention is not limited thereto, is capable of modification, and can be arranged without departing from the spirit and scope of the invention.

What is claimed is:

1. Apparatus for the magnetic separation of small parts in accordance with their magnetic properties, comprising:

an elongated, generally vertically disposed container adapted to receive and hold a column of liquid, the container having an opening at its upper end into which a plurality of small parts to be separated may be introduced, and the liquid having a density such that the parts may settle in the column by gravity;

a magnetic device located adjacent a side wall of the container to deflect those parts having magnetic properties toward that side wall;

means for separating the parts so deflected from those not so deflected which includes a first and a second collecting means, the first collecting means comprising a side leg that slants downwardly and outwardly from the column, and wherein the magnetic device is positioned in close proximity to the upper intersection of the side leg and the column; and a baffle positioned at the intersection of the side leg and the column, which baffle extends vertically upward from a point adjacent the lower intersection of the side leg and the column to a point below the upper intersection of the side leg and the column.

2. The apparatus of claim 1 wherein a second baffle is positioned below the opening of the column and above the intersection of the side leg and the column, which baffle extends part way across the column and slopes downwardly toward the magnet and the side leg.

3. Apparatus for the magnetic separation of small parts in accordance with their magnetic properties, comprising:

an elongated, generally vertically disposed container adapted to receive and hold a column of liquid, the container having an opening at its upper end into which a plurality of small parts to be separated may be introduced, and the liquid having a density such that the parts may settle in the column by gravity;

a magnetic device located adjacent a side wall of the container to deflect those parts having magnetic properties toward that side wall;

means for separating the parts so deflected from those not so deflected which includes a first and a second collecting means, the first collecting means comprising a side leg that slants downwardly and outwardly from the column, and wherein the magnetic device is positioned in close proximity to the upper intersection of the side leg and the column, the second collecting means including a wire basket positioned in the column below the intersection of the side leg and the column wherein the basket is provided with a vertically extending handle that extends from the basket to a point above the opening of the container.

4. A method for separating defective parts from a group of parts which includes parts having desired characteristics and defective parts, comprising the steps of:

placing magnetic particles on the defective parts to identify the defective parts;

introducing the group of parts in a vertical column of liquid and allowing the parts to settle by gravity in the column;

subjecting the column from one of its sides to the influence of a magnetic device to deflect the defective parts toward such device while they are settling; and collecting the defective parts so deflected in an isolated region of the column.

5. The method of claim 4 separating defective parts from a group of parts which includes parts having desired characteristics and defective parts of claim 11 wherein the parts are semiconductor wafers.

6. The method of claim 4 wherein the liquid is trichloroethylene.

References Cited

UNITED STATES PATENTS

| | | | |
|---|---|---|---|
| 228,329 | 6/1880 | Edison | 209—232 X |
| 430,275 | 6/1890 | Edison | 209—39 |
| 957,709 | 5/1910 | Phillips | 137—268 X |
| 2,056,426 | 10/1936 | Frantz | 209—232 |
| 2,164,666 | 7/1939 | Simmons | 137—313 |
| 2,258,194 | 10/1941 | Queneau | 209—232 |

ALLEN N. KNOWLES, Primary Examiner

L-566-PT
(6-69)

UNITED STATES PATENT OFFICE
CERTIFICATE OF CORRECTION

Patent No. 3,474,904 Dated October 28, 1969

Inventor(s) Bernard G. Casner and Ray T. Goulstone

It is certified that error appears in the above-identified patent and that said Letters Patent are hereby corrected as shown below:

Column 3, line 58, after "surface" insert --of--.

Column 4, line 47, "nd" should be --and--.

Claim 5, line 35, delete "claim 4";
line 37, "claim 11" should be --claim 4--.

SIGNED AND
SEALED
APR 28 1970

(SEAL)
Attest:

Edward M. Fletcher, Jr.
Attesting Officer

WILLIAM E. SCHUYLER, JR.
Commissioner of Patents